United States Patent
Hamrick

[19]

[11] Patent Number: 6,120,074
[45] Date of Patent: Sep. 19, 2000

[54] CABLE EYE PROTECTOR

[76] Inventor: Bret A. Hamrick, 275 SE. 119th, South Beach, Oreg. 97366

[21] Appl. No.: 09/136,028

[22] Filed: Aug. 18, 1998

[51] Int. Cl.[7] ........................................................ B66C 1/12
[52] U.S. Cl. ............................................ 294/74; 294/82.11
[58] Field of Search ............................ 294/74, 77, 82.11; 403/210, 213; 24/129 R, 115 K, 197, 200

[56] References Cited

U.S. PATENT DOCUMENTS

| | | | |
|---|---|---|---|
| 1,222,048 | 4/1917 | Sunderland | 294/74 |
| 2,040,642 | 5/1936 | Browne | 403/210 |
| 2,152,096 | 3/1939 | Russell | 294/74 |
| 2,354,280 | 7/1944 | Russell | 294/74 |
| 2,569,912 | 10/1951 | Andersen | 294/74 |
| 2,793,903 | 5/1957 | Mallard | 294/74 |
| 3,083,991 | 4/1963 | Gale | 287/81 |
| 4,164,378 | 8/1979 | Linehan | 403/210 |
| 4,441,748 | 4/1984 | St. Germain | 294/74 |
| 5,018,775 | 5/1991 | McKenna et al. | 294/74 |

FOREIGN PATENT DOCUMENTS

| | | | |
|---|---|---|---|
| 2431-074 | 3/1980 | France | 294/74 |
| 1808807 A1 | 4/1993 | U.S.S.R. | |
| 509683 | 7/1939 | United Kingdom | 294/82.11 |

OTHER PUBLICATIONS

The American Group sales brochure, p. 38, Nylite Spool, Shield, Shackle & Snatch Block, at least as early as Oct., 1997.

*Primary Examiner*—Dean J. Kramer
*Attorney, Agent, or Firm*—Miller Nash LLP

[57] ABSTRACT

A removable protector having a bell-shaped outer periphery with a front surface, a back surface, and a bottom opening. A front eye opening is defined in the front surface and a back eye opening is defined in the back surface. The bottom opening is larger than the eye outer diameter so that the cable eye may be inserted therethrough. A connector is inserted through the front eye opening, the cable eye, and the back eye opening to rotatably secure the cable eye within the protector. The present invention also includes a method for using the cable eye protector.

13 Claims, 3 Drawing Sheets

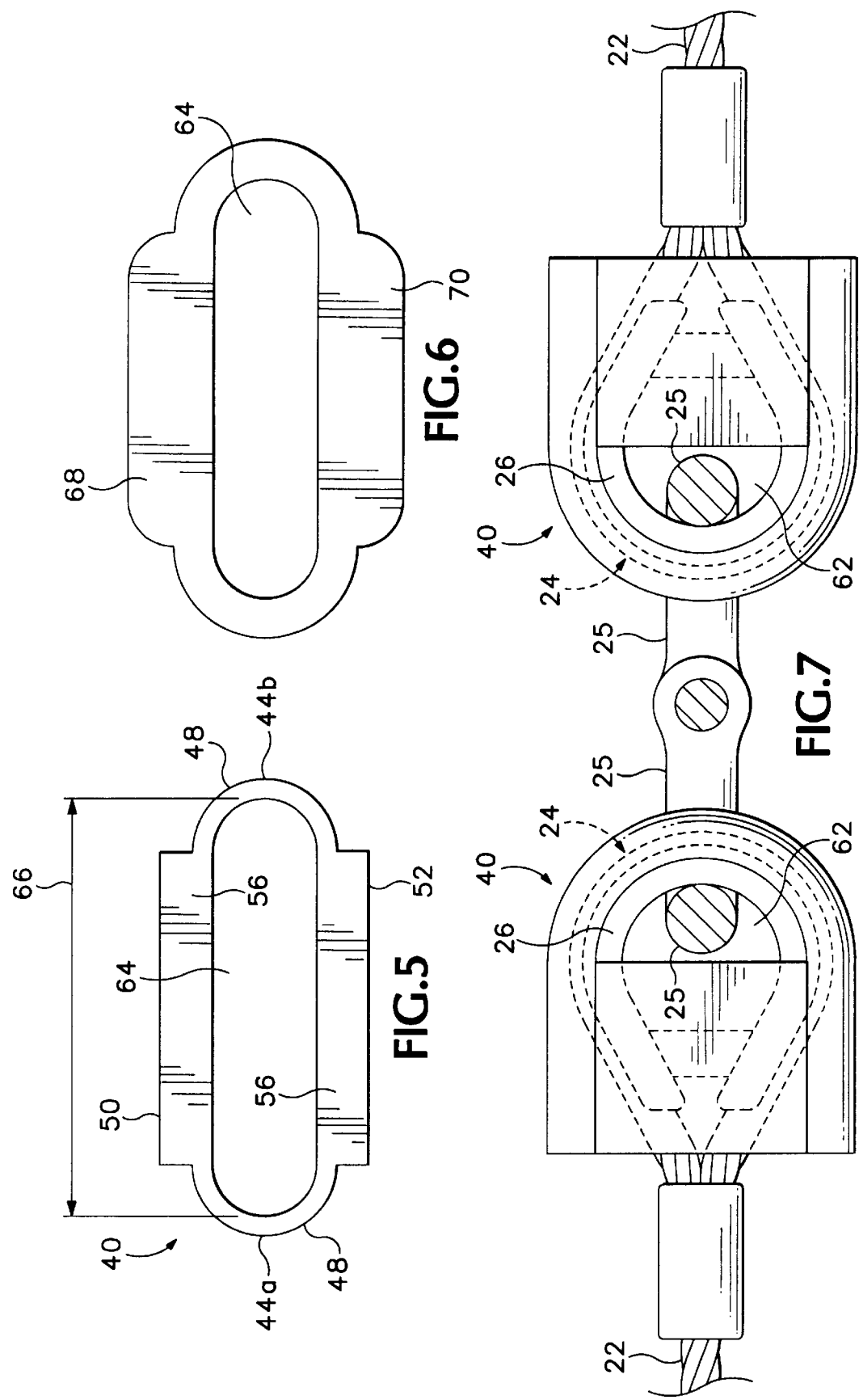

CABLE EYE PROTECTOR

BACKGROUND OF THE INVENTION

The present invention relates to a device for protecting the outer periphery of a cable eye.

Fishermen often use large nets 10 such as those as shown in FIG. 1. The nets generally have a mouth 12 (into which the fish enter) at one end and a cod end 14 (where the fish get caught) at the other. The mouth 12 generally has a head rope 16 that floats at or near the top of the water and a foot rope 18 (or bottom bridle) that sinks and usually drags along the bottom surface. The nets 10 are pulled by cables 22 connected to the net 10. The cables 22, also referred to as mud gear, are comprised of multiple slots 20. Each slot 20 has at least one cable eye 24 that is connected to another cable eye 24 using a connector 25 such as a hammerlock (shown in cross section in FIG. 7) that is threaded through the cable eye 24.

Because the foot rope 18 and mud gear are dragged along the bottom surface while in use, the cable eyes 24 and connectors 25 are subject to heavy chaffing. The heavy chaffing tends to cause the outer periphery of the cable eyes 24 to break. Further, the heavy chaffing can cause damage to the connectors 25.

FIG. 2 shows a known cable eye 24 with a thimble 26. Other exemplary thimbles are set forth in J. G. Gale U.S. Pat. No. 3,083,991 and W. C. Russell U.S. Pat. No. 2,354,280. These thimbles are designed to protect the inner periphery of the eye 24 from excessive wear from the rubbing of the connector 25. Unfortunately, these thimbles do not prevent the cable 10 from breaking when the cable 22 is dragged along the bottom surface causing the outer periphery of the cable eye 24 excessive wear and damage.

McKenna et al. U.S. Pat. No. 5,018,775 disclose a rope assembly that has an eye-type structure encapsulated in plastic. Such a plastic encapsulation would not be suitable for withstanding the excessive wear and damage caused by dragging along the bottom surface. Further, although there is no mention in the patent as to how the encapsulation is done, it appears that it could not be accomplished in the field. Instead, special ropes with pre-encapsulated eyes would have to be used. This would require a user to carry multiple ropes with the pre-encapsulated ends.

Another patent that suggests a means for protecting the outer periphery of an eye-structure is Linehan U.S. Pat. No. 4,164,378 that discloses a rope fitting. This patent requires the use of factory pre-prepared molded "plugs" which can be inserted into a protective shroud. The plugs are made by inserting a load-distributing structure into the recurving portion of rope and then encapsulating the combination in plastic. Because the plugs are pre-prepared in a factory, special ropes must be purchased to replace existing ropes. Also, the plastic encapsulation would likely deteriorate if it were to be dragged along a bottom surface. Finally, the plastic encapsulation restricts movement of the eye-structure within the shroud.

FIG. 3 shows a permanent protector 30 for the outer periphery of the eye 24. This permanent protector 30 is constructed from a piece of metal 32 with a semi-circular cross section that is bent around the outer periphery of a cable eye 24. The metal 32 is then welded flush to the thimble 26. This permanent protector 30 has several problems. For example, it cannot be reused. Also, the permanent protector 30 requires a time consuming installation process of bending metal and welding. Still further, when the protector 30 drags along the bottom, the welding joints 34 may be ground off so that the protector 30 comes off the cable eye 24. These and other problems make the permanent protector 30 an unattractive option.

None of the devices set forth above are suitable for easy installation and removal on standard cable eyes in a multitude of locations including, but not limited to, on board a water craft.

BRIEF SUMMARY OF THE INVENTION

A cable eye protector according to the present invention protects the outer periphery of a cable eye. Further, it is simple to install and, therefore, can be installed at a moment's notice in most locations. Still further, because the protector is not a load bearing structure, relative movement between the cable eye and the protector is permissible. This relative movement also allows more flexibility in a linked cable.

A removable protector of the present invention preferably has a bell-shaped outer periphery protector with a front surface, a back surface, and a bottom opening. The protector further has a front eye opening defined in the front surface and a back eye opening defined in the back surface. The bottom opening is larger than the eye outer diameter so that the cable eye may be inserted therethrough. A connector is inserted through the front eye opening, the cable eye, and the back eye opening to rotatably secure the cable eye within the protector.

The present invention also includes a method for reusing the cable eye protector.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 5 is a bottom view of a cable eye with the cable eye protector of the present invention.

FIG. 6 is a bottom view of a cable eye with an alternate embodiment of a cable eye protector.

FIG. 7 is a cross-sectional view of two connected cable eyes with cable eye protectors thereon.

DETAILED DESCRIPTION OF THE PREFERRED EMBODIMENT

Figure 1:
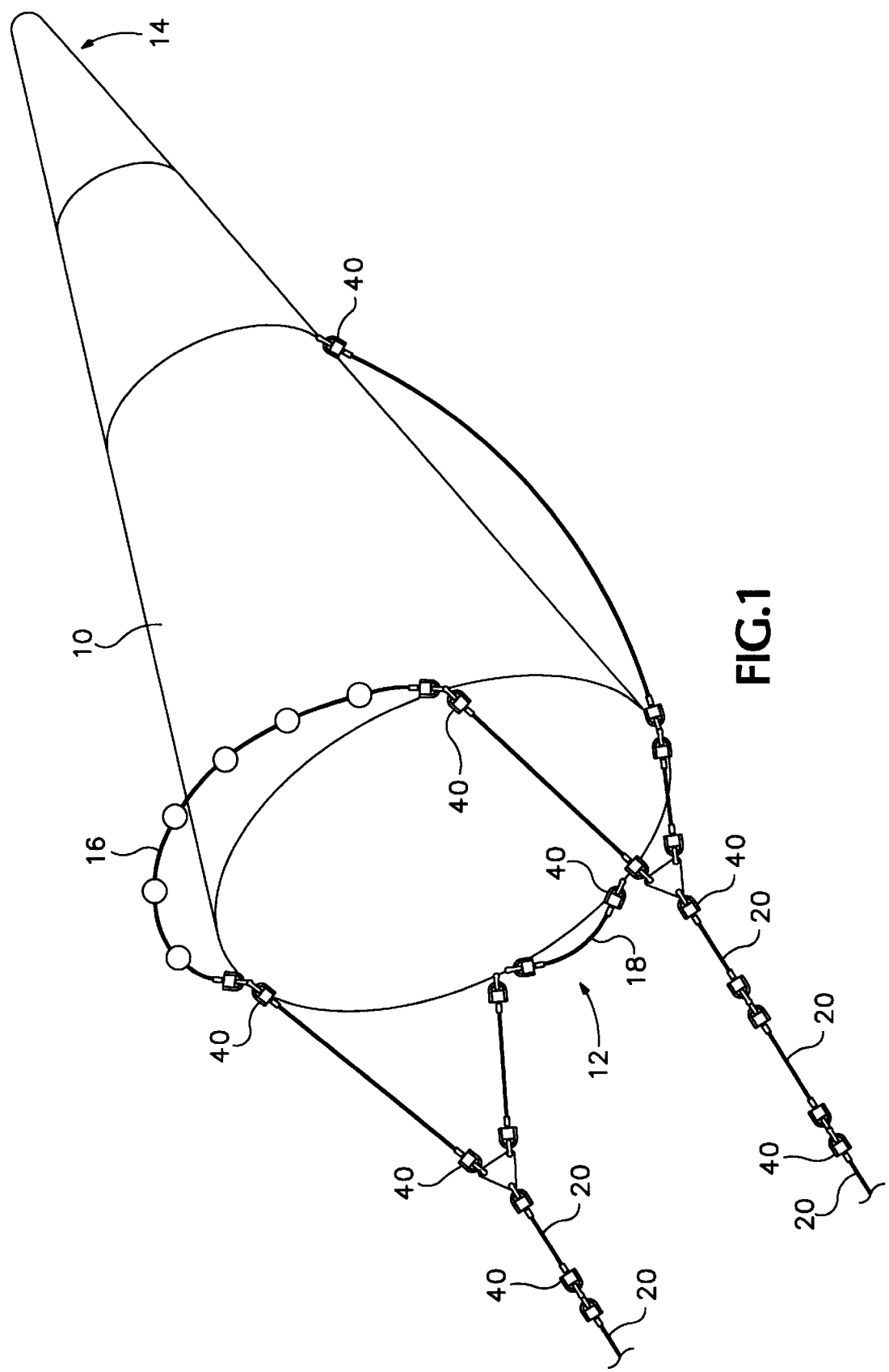
FIG. 1 is a perspective view of a fishing net incorporating cable eye protectors of the present invention.
Figure 2:
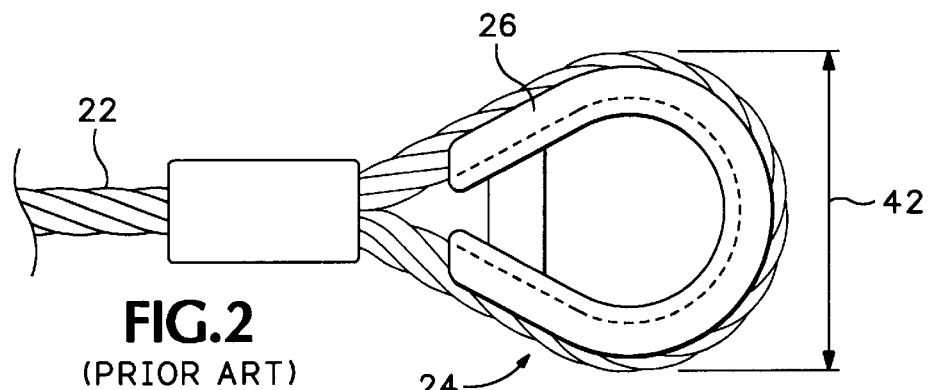
FIG. 2 is a front view of a cable eye with a thimble.
Figure 3:
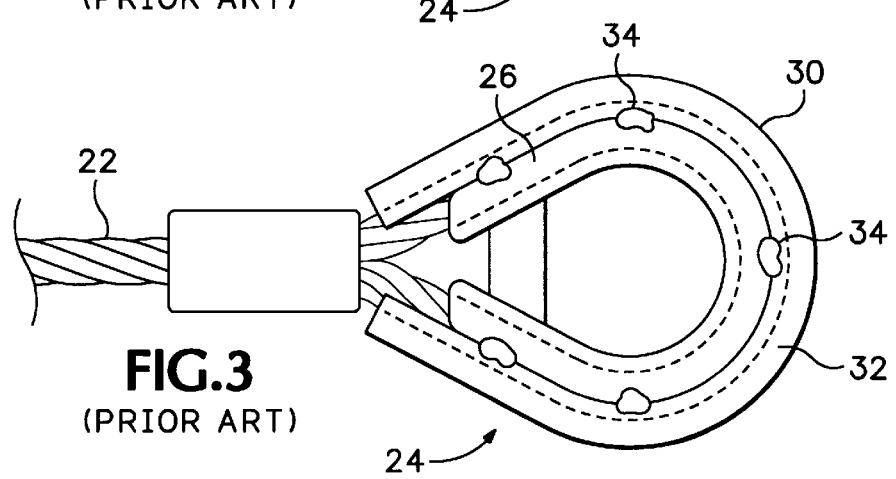
FIG. 3 is a front view of a cable eye with a thimble and a permanent eye protector.
Figure 4:
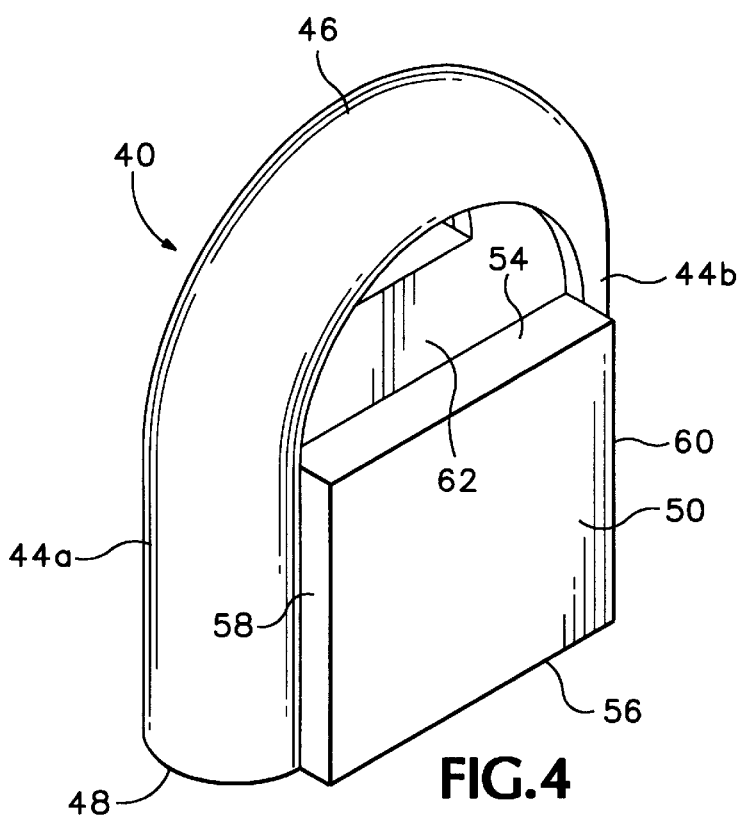
FIG. 4 is a front view of a cable eye with the cable eye protector of the present invention.

An exemplary embodiment of a removable protector 40, as shown in FIGS. 4 and 5, is suitable for protecting the outer periphery of a cable eye 24. The cable eye 24 has an eye outer diameter with an eye outer diameter maximum width 42.

The protector 40 is substantially bell-shaped or flattened bell-shaped so as to form a sleeve into which the cable eye 24 may be inserted. Although the protector 40 may be a solid unit, it may also be made from several joined or welded pieces. For convenience, whether the protector 40 is a solid unit or a joined unit, the pieces will be described separately.

For example, the protector 40 may have two legs 44a, 44b, each leg having a connected end 46 and an unconnected end 48. The connected end 46 of the first leg 44a is connected to the connected end 46 of the second leg 44b. The unconnected end 48 of the first leg 44a and the unconnected end 48 of the second leg 44b are spaced at a distance greater than the eye outer diameter maximum width 42. It should be noted that the legs 44a, 44b may be a single bent or U-shaped member.

The protector 40 also has a front surface 50 that functions as a surface protector for one surface of the cable eye 24 and a back surface 52 that functions as a surface protector for a second surface of the cable eye 24. If the protector 40 were made from several joined pieces, the front and back surface protectors 50, 52 would each have a top edge 54, a bottom edge 56, a first side edge 58 and a second side edge 60. The first side edges 58 of the front and back surface protectors 50, 52 would preferably be attached to the first leg 44a. The second side edges 60 of the front and back surface protectors 50, 52 would preferably be attached to the second leg 44b.

The front and back of the protector 40 have eye openings 62 defined therein. (The back eye opening is not shown, however it would be identical to the front eye opening 62.) If the protector 40 were made from several joined pieces, the front of the protector 40 would have a front eye opening 62 defined between the connected ends 46 of the first and second legs 44a, 44b and the top edge 54 of the front surface protector 50. Similarly, the back of the protector 40 would have a back eye opening defined between the connected ends 46 of the first and second legs 44a, 44b and the top edge 54 of the back surface protector 52.

As mentioned above, the protector 40 forms a sleeve into which the cable eye 24 may be inserted. The cable eye 24 is inserted through a bottom opening 64 of the protector 40. The bottom opening 64 is preferably defined between the unconnected ends 48 of the first and second legs 44a, 44b and the bottom edges 56 of the front and back surface protectors 50, 52. The bottom opening 64 has at least one inner diameter 66 with a width greater than the eye outer diameter maximum width 42. The inner diameter 66 is preferably defined between the inner surfaces of the two legs 44a, 44b.

The protector 40 is secured to the cable eye 24 by a connector 25. The connector 25 is insertable through the front eye opening 62, cable eye 24, and back eye opening (not shown). Once the connector 25 is inserted and fastened, the connector 25 secures the cable eye 24 rotatably within the protector 40.

An optional feature of the present invention, as shown in FIG. 6, is a thick front surface protector 68 and a thick back surface protector 70. Preferably the thick front and back surface protectors 68, 70 are sufficiently thick to extend beyond the connector 25 and thereby protect the connector 25 as well as the front and back of the cable eye 24.

The removable protector 40 may be made from heavy material such as metal for those installed along the bottom bridle and mud gear. However, a lightweight version made of a light material such as kevlar may be made to be installed along the head rope. This light-weight version would not cause the head rope to sink and would not add substantial weight thereto.

The removable cable eye protector 40 is installed by first inserting the cable eye 24 through the bottom opening 64 of the protector 40. Next, the connector 25 is threaded through the front eye opening 62 of the protector 40, the cable eye 24, and the back eye opening (not shown) of the protector 40. Finally, the cable eye 24 is rotatably secured within the protector 40 by fastening or otherwise securing the connector 25. The removable cable eye protector 40 is removed from the cable eye 24 by first unfastening the connector 25. Next, the connector 25 is unthreaded through the back eye opening of the protector 40, the cable eye 24, and the front eye opening 62 of the protector 40. Finally, the cable eye 24 is withdrawn through the bottom opening 64 of the protector 40.

FIG. 7 shows two cable eyes 24 protected by two protectors 40 connected by a single connector 25 shown in cross section. To connect two cable eyes, the first cable eye 24 is inserted through the bottom opening 64 of the first protector 40 and the second cable eye 24 is inserted through the bottom opening 64 of the second protector 40. Next, the connector 25 is threaded through the front eye opening 62 of the first protector 40, the first cable eye 24, and the back eye opening (not shown) of the first protector 40. Then, the connector 25 is threaded through the front eye opening 62 of the second protector 40, the second cable eye 24, and the back eye opening (not shown) of the second protector 40. Finally, the cable eyes 24 are rotatably secured within their respective protectors 40 by fastening or otherwise securing the connector 25. The removable cable eye protectors 40 are removed from the cable eyes 24 by first unfastening the connector 25. Then, the connector 25 is unthreaded through the back eye opening of the second protector 40, the second cable eye 24, and the front eye opening 62 of the second protector 40. Next, the connector 25 is unthreaded through the back eye opening of the first protector 40, the first cable eye 24, and the front eye opening 62 of the first protector 40. Finally, the first cable eye 24 is withdrawn through the bottom opening 64 of the first protector 40 and the second cable eye 24 is withdrawn through the bottom opening 64 of the second protector 40.

It should be noted that the removable protector 40 may have an alternate shape, such as a brick-like shape. It should also be noted that the thick front and back surface protectors 68, 70 may be substantially thicker than as shown to protect thicker connectors 25.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A removable protector for protecting the outer periphery of a cable eye, said cable eye having an outer diameter with an eye outer diameter maximum width, said protector comprising:

(a) an outer periphery protector with a first and second leg, each said leg having a connected end and an unconnected end, said connected end of said first leg being connected to said connected end of said second leg, said unconnected end of said first leg and said unconnected end of said second leg being spaced at a distance greater than said eye outer diameter maximum width;

(b) front and back surface protectors each having a top edge, a bottom edge, and first and second side edges, said first side edges of said front and back surface protectors attached to said first leg, said second side edges of said front and back surface protectors attached to said second leg;

(c) a front eye opening defined between the connected ends of said first and second legs and said top edge of said front surface protector;

(d) a back eye opening defined between the connected ends of said first and second legs and said top edge of said back surface protector;

(e) a bottom opening defined between the unconnected ends of said first and second legs and said bottom edges of said front and back surface protectors; and (f) a connector insertable through said front eye opening, cable eye, and back eye opening, said connector securing said cable eye rotatably within said protector.

2. The protector of claim 1 wherein said protector is a solid unit.

3. The protector of claim 1 wherein said protector is made of heavy material.

4. The protector of claim 1 wherein said protector is made of metal.

5. The protector of claim 1 wherein said protector is made of light material.

6. The protector of claim 1 wherein said protector is made of kevlar.

7. The protector of claim 1 wherein said front and back surface protectors are thick and thereby extend beyond said connector.

8. The protector of claim 1 wherein said front surface and said back surface are substantially parallel.

9. The protector of claim 1, said connector having a connector width, said bottom opening having at least one outer diameter with a width greater than said connector width.

10. The protector of claim 1 wherein said outer periphery protector is substantially flattened bell-shaped.

11. The protector of claim 1 wherein said outer periphery protector is substantially U-shaped.

12. A method for using a removable cable eye protector, said method comprising the steps of:

(a) inserting a cable eye through a bottom opening of a protector;

(b) threading a connector through a front eye opening of said protector, said cable eye, and a back eye opening of said protector;

(c) rotatably securing said cable eye within said protector by fastening said connector;

(d) inserting a second cable eye through a bottom opening of a second protector; and (e) threading said connector through a front eye opening of said second protector, said second cable eye, and a back eye opening of said second protector prior to said step of rotatably securing said cable eye.

13. The method of claim 12 further comprising the step of removing said cable eye from said protector, said step of removing further comprising the steps of:

(a) unfastening said connector;

(b) unthreading said connector through said back eye opening of said second protector, said second cable eye, and said front eye opening of said second protector;

(c) unthreading said connector through said back eye opening of said protector, said cable eye, and said front eye opening of said protector;

(d) withdrawing said cable eye through said bottom opening of said protector; and (e) withdrawing said second cable eye through said bottom opening of said second protector.

* * * * *